L. G. WALKER.
POWER MOWING MACHINE.
APPLICATION FILED FEB. 24, 1914.

1,172,326.

Patented Feb. 22, 1916.

WITNESSES:

INVENTOR

UNITED STATES PATENT OFFICE.

LUTHER G. WALKER, OF PUEBLO, COLORADO.

POWER MOWING-MACHINE.

1,172,326.

Specification of Letters Patent. Patented Feb. 22, 1916.

Application filed February 24, 1914. Serial No. 820,387.

*To all whom it may concern:*

Be it known that I, LUTHER G. WALKER, a citizen of the United States, and a resident of Pueblo, in the county of Pueblo and State of Colorado, have invented certain new and useful Improvements in Power Mowing-Machines, of which the following is a full, clear, and exact description.

My invention relates to power driven mowing machines and its primary object is the provision of a power plant which may be readily applied to existing mowing machines without any substantial alteration in their structure or rendering them unfitted for detaching and immediate use as horse drawn machines in case of engine troubles and which may be provided with machines of the type now in use without altering the construction of said machines.

To this end in its preferred form my invention comprises an A-shaped frame on which an engine, reversing mechanism, and a jack shaft are centrally mounted, which frame carries a steering wheel at its front and attaching means at its rear adapted to secure the frame to the casing which surrounds the shaft of a mowing machine. Means driven by the jack shaft mentioned are provided for driving the mower directly from its own traction wheels, and from this combination certain new and very desirable results are obtained and a structure of extreme simplicity and economy results.

Figure 1:
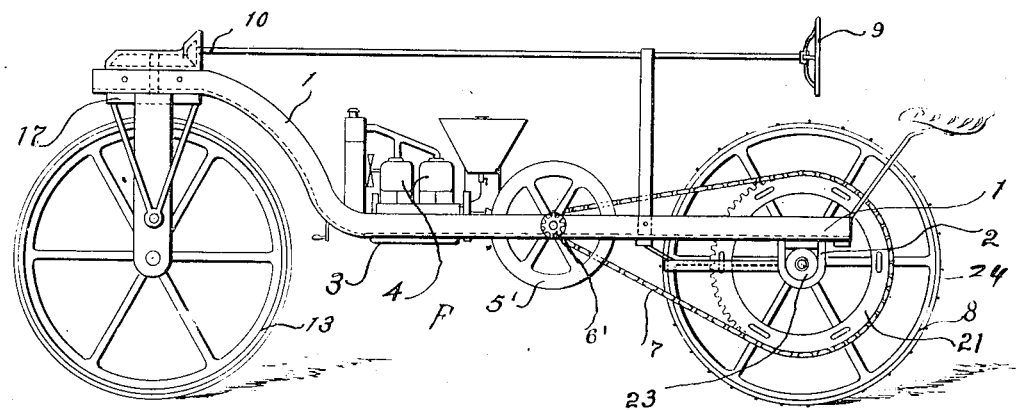
Figure 2:
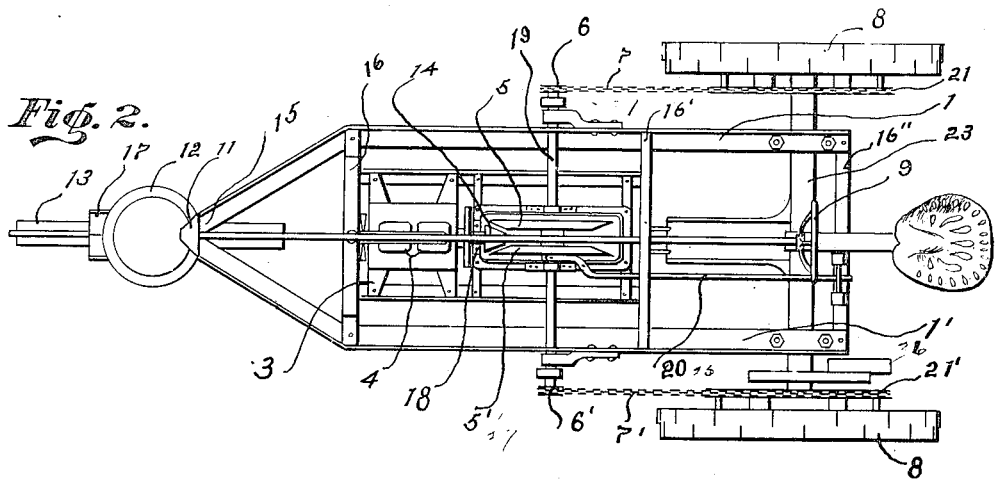

In the single sheet of drawings accompanying this application and forming a part hereof, Figure 1 is a left side elevation of my invention, the left traction wheel and drive chain and the cutter bar actuating mechanism being removed to disclose hidden parts; and Fig. 2 is a plan view of the entire device with the exception of the cutter bar.

Referring to the drawings, the power plant carrying frame F is composed of side members 1, 1' brought together at the front and joined at intervals by the cross members 16, 16', 16''. Foot anchors 3 form means of securing the engine 4 to a supplemental engine frame carried by the main frame F and the engine shaft extends rearwardly through the bearing 18 and terminates in a friction wheel 14 which is located between the friction disks 5. These friction disks 5 are keyed to the jack shaft 19 and are adapted to be shifted by a lever 20 to bring one or the other into engagement with the friction wheel 14, thus forming a driving and reversing mechanism for the jack shaft, which shaft is preferably provided with differentials 27. On the extremities of the jack shaft 19 sprocket wheels 6, 6' are provided and sprocket chains 7, 7' run on these wheels.

The side members 1, 1', are brought together at 15 where the steering wheel bracket 17 is attached, the bracket 17 providing a pivot for the control of the steering wheel 13 through the intermediary of the bevel gears 11, 12. Of these gears 12 is rigid with the post of the wheel 13 and the gear 11 is mounted on the end of a shaft 10 which carries a steering wheel 9 within reach of a driver on the seat and thus the direction of travel of the machine may be controlled.

Combined with the power mechanism heretofore described there is a mowing machine of the ordinary horse drawn type. This machine comprises traction wheels 8 mounted on the drive shaft 24 around which shaft is the stationary casing 23 to which the main frame F is connected by U bolts 2. The casing 23 also carries the gear casings 25, 26, within which are mounted the usual cutter bar actuating gears which are driven by the shaft 24.

The cutting mechanism which it is intended to employ, being of the usual well known forms and forming no part of my invention, has been omitted from the drawings to avoid confusion thereof, the gears which actuate it being merely indicated. I have, however, added to the mowing machine one element and that is the large gears 21 which are secured to the inner side of the wheels 8 and on which the sprocket chains 7, 7', driven from the jack shaft 19, run.

A combined machine of the type described has a decided advantage over an independent tractor which draws a separate mower in that if a stand of hay of unusual thickness is encountered the machine will not clog. This is for the reason that if the knives meet unusual resistance the tractor wheels will spin and thus the knives will keep on reciprocating until the grass is cut, the resistance to the knives reduced, and the traction again started. On the other hand if the machine were being pulled or dragged and the knives met unusual resistance either the mower would be pulled forward without cutting or the wheels of the tractor would spin and no motion would be imparted to the knives (since in that type of machine it is the rotation of the mower's tractors which causes the knives to reciprocate). In case a complete power mowing machine in which the tractor wheels and cutting devices are both driven from the same engine through separate clutches is provided, two disadvantages are encountered: first the machine must have a multiplicity of parts and is very expensive to make and maintain; and second, if heavy grass be encountered and it is desired to run the cutting mechanism without advancing the machine, a manual shifting of the gears is required. This latter action is not automatic but depends on the close attention of the driver and the machine is liable to be stalled before his attention is called to the heavy grass.

Having thus described my invention what I claim and desire to secure by Letters Patent is:

1. In combination, a mowing machine comprising tractor wheels, a drive shaft mounted in said wheels and adapted to be driven thereby, a casing around said shaft, cutter bar actuating mechanism mounted adjacent said shaft and adapted to be driven thereby, with a frame adapted to be connected at its rear end to said casing, said frame carrying a steering wheel at its front, an engine, a jack shaft, clutch mechanism between said engine and said jack shaft, and means for driving said traction wheels from said jack shaft.

2. In combination, a mowing machine comprising tractor wheels, sprocket wheels mounted on said tractor wheels, a drive shaft mounted in said wheels and adapted to be driven thereby, a casing on said shaft, cutter bar actuating mechanism mounted adjacent said shaft and adapted to be driven thereby, with a frame adapted to be connected at its rear end to said casing, said frame carrying a steering wheel at its front, an engine, a jack shaft having sprocket wheels thereon, clutch mechanism between said engine and said jack shaft, and sprocket chains for actuating said first mentioned sprockets from said sprockets on the jack shaft.

LUTHER G. WALKER.

Witnesses:
L. B. WILEY,
C. M. WALKER.

Copies of this patent may be obtained for five cents each, by addressing the "Commissioner of Patents, Washington, D. C."